United States Patent
Zheng et al.

(10) Patent No.: US 8,881,113 B2
(45) Date of Patent: Nov. 4, 2014

(54) CONTEXTUAL EXCEPTION MANAGEMENT IN MULTI-TENANT SYSTEMS

(75) Inventors: Zuye Zheng, San Francisco, CA (US); James Iry, Richmond, CA (US); Nagraj Kulkarni, Santa Clara, CA (US)

(73) Assignee: salesforce.com, inc., San Francisco, CA (US)

(*) Notice: Subject to any disclaimer, the term of this patent is extended or adjusted under 35 U.S.C. 154(b) by 116 days.

(21) Appl. No.: 13/396,509

(22) Filed: Feb. 14, 2012

(65) Prior Publication Data

US 2013/0036407 A1 Feb. 7, 2013

Related U.S. Application Data

(60) Provisional application No. 61/513,764, filed on Aug. 1, 2011, provisional application No. 61/513,766, filed on Aug. 1, 2011.

(51) Int. Cl.
*G06F 11/36* (2006.01)
*G06F 9/44* (2006.01)
*G06F 11/07* (2006.01)

(52) U.S. Cl.
CPC ........ *G06F 11/0775* (2013.01); *G06F 11/0781* (2013.01); *G06F 11/0709* (2013.01)
USPC .......................................... 717/127; 717/135

(58) Field of Classification Search
USPC .................................. 717/127, 135
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,828,830 A * | 10/1998 | Rangaraian et al. | ............ 714/48 |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| 6,339,832 B1 * | 1/2002 | Bowman-Amuah | ............ 714/35 |

(Continued)

*Primary Examiner* — Li B Zhen
*Assistant Examiner* — Viva Miller
(74) *Attorney, Agent, or Firm* — Ingrassia Fisher & Lorenz, P.C.

(57) ABSTRACT

Methods and systems are provided for assigning exceptions in a multi-tenant system providing instances of a virtual application over a network to multiple tenants. One exemplary method of assigning an exception record corresponding to an anomalous condition identified by an instance of the virtual application involves obtaining context information associated with the anomalous condition from the instance of the virtual application and automatically assigning the exception record to a development entity based at least in part on the context information.

15 Claims, 10 Drawing Sheets

(56) References Cited

U.S. PATENT DOCUMENTS

| | | |
|---|---|---|
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,139,999 B2 * | 11/2006 | Bowman-Amuah .......... 717/101 |
| 7,340,411 B2 | 3/2008 | Cook |
| 7,600,160 B1 * | 10/2009 | Lovy et al. ...................... 714/57 |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0087950 A1 * | 7/2002 | Brodeur et al. ................ 717/124 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0188296 A1 * | 10/2003 | Bates et al. .................... 717/130 |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0015678 A1 * | 1/2005 | Miller ............................. 714/38 |
| 2005/0050555 A1 | 3/2005 | Exley et al. |
| 2005/0065925 A1 * | 3/2005 | Weissman et al. ................ 707/4 |
| 2005/0091098 A1 | 4/2005 | Brodersen et al. |
| 2006/0064486 A1 * | 3/2006 | Baron et al. .................. 709/224 |
| 2006/0085245 A1 * | 4/2006 | Takatsuka et al. ................ 705/9 |
| 2007/0067754 A1 * | 3/2007 | Chen et al. .................... 717/127 |
| 2007/0118844 A1 * | 5/2007 | Huang et al. .................. 719/330 |
| 2009/0028053 A1 * | 1/2009 | Kannan et al. ................ 370/241 |
| 2009/0138763 A1 * | 5/2009 | Arnold ............................ 714/45 |
| 2009/0210862 A1 * | 8/2009 | Viswanadha et al. .......... 717/125 |
| 2009/0288084 A1 * | 11/2009 | Astete et al. ...................... 718/1 |
| 2010/0306782 A1 * | 12/2010 | Engrand et al. ............... 719/312 |
| 2011/0185282 A1 * | 7/2011 | Mahmood et al. ............. 715/744 |
| 2011/0209122 A1 * | 8/2011 | Fuhrer et al. .................. 717/125 |
| 2013/0055206 A1 * | 2/2013 | Dudek et al. .................. 717/124 |

* cited by examiner

| | |
|---|---|
| Received: | from [10.237.9.131] ([10.237.9.131:49998] helo=ops-mta2-2-was.ops.sfdc.net) by mx2-sjl.mta.salesforce.com (envelope-from <SFDC-app@na11-app1-4-was.ops.sfdc.net>) (ecelerity 2.2.2.45 r()) with ESMTP id CB/7C-19915-120F5AE4; Mon, 24 Oct 2011 23:09:22 +0000 |
| Received: | from [10.236.74.5] ([10.236.74.5:35039] helo=na11-app1-4-was.ops.sfdc.net) by ops-mta2-2-was.ops.sfdc.net (envelope-from <SFDC-app@na11-app1-4-was.ops.sfdc.net>) (ecelerity 2.2.2.45 r()) with ESMTP id C9/56-10100-120F5AE4; Mon, 24 Oct 2011 23:09:21 +0000 |
| Date: | Mon, 24 Oct 2011 23:09:21 +0000 (GMT) |
| From: | "SFDC-app@na11-app1-4-was.ops.sfdc.net" <SFDC-app@na11-app1-4-was.ops.sfdc.net> |
| To: | "gack@salesforce.com" <gack@salesforce.com> |
| Message-ID: | <852936422.13449.1319497761700.JavaMail.sfdc@na11-app1-4-was.ops.sfdc.net> |
| Subject: | JAVA.ClassCastException -> java.lang.ClassCastException: cannot assign instance of java.util.HashMap to field common.api.soap.Entity.act of type common.apex.runtime.ApexObjectType in instance of common.api.soap.Entity at java.io.ObjectStreamClass$FieldReflector.setObjFieldValues(ObjectStreamClass.java:2032) |
| MIME-Verison: | 1.0 |
| Content-Type: | text/plain; charset=utf-8 |
| Content-Transfer-Encoding: | quoted-printable |
| X-Priority: | 1 |
| Thread-Topic: | StackTraceId-579176459 |
| X-SFDC-TLS-NoRelay: | 1 |
| X-SFDC-Binding: | Gack |
| Date: | Mon Oct 24 23:09:21 GMT 2011 |
| Hostname: | na11-app1-4-was.ops.sfdc.net |
| SettingsPath: | prod-was.na11.app ← 710 |
| JavaVersion: | 1.6.0_21 ← 702 |
| UniqueId: | 392377479-37131 ← |
| StackTraceId: | 579176459 ← |
| Allowed: | 24511  ← 704 |
| Blocked: | 105 |
| ThreadId: | 576580 |
| ThreadName: | /apex/PixelCorps |
| Category: | JAVA.ClassCastException |
| SubCategory: | java.io |
| SourceClassName: | core.apexpages.exceptions.ApexPagesExceptionHandler |
| SourceMethodName: | handleUnhandledException ← 708 |
| OrganizationId: | 12DA1234567lk6v ← 706 |
| UserId: | 115G65432311wFFS ← |
| Subject: | java.lang.ClassCastException: cannot assign instance of java.util.HashMap to field common.api.soap.Entity.act of type common.apex.runtime.ApexObjectType in instance of common.api.soap.Entity ExtendedMessage:=20 |
| Compiling?: | false |
| DevMode?: | false |
| PDF?: | false |
| Org Namespace: | [none] |
| Current Namespace: | [none] |

| | | |
|---|---|---|
| Referer: | https://tenant1.secure.force.com/tenant1/Tenant1<br>Top-level Viewinfo: | |
| Class: | NA | — 804 |
| Id: | NA | |
| Version: | [intV=3D174.0,extV=3D23.0,Winter 12] ← 806 | |
| Exception wrapper: | core.apexpages.exceptions.ApexPagesGenericException | |
| java.lang.ClassCast<br>Exception: | cannot assign instance of java.util.HashMap to field common.api.soap.Entity.aot of type common.<br>apex.runtime.ApexObjectType.in instance of common.api.soap.Entity VersionInfo:=20 | |
| Branch: | /home/build/autobuild/clients/174_prod_producer_1/app/174/prod/core/... | |
| CreationDate: | Fri Oct 21 22:50:40 GMT 2011 | — 810 |
| Changelist: | Change 2020991 on 2011/10/21 by gfee@GFEE-WS2 http://gus.soma.salesforce.com | |
| JavaRelease: | /home/build/autobuild/clients/174_prod_producer_1/tools/Linux/jdk/jdk1.6.0_21 ← 808 | |
| SerialNumber: | 20111021225040O224 | |
| CacheId: | 20111021225040O224 | |
| Thrown: | lib.gack.GackContext: java.lang.ClassCastException.cannot assign instance of java.util.HashMap to field<br>common.api.soap.Entity.aot of type common.apex.runtime.ApexObjectType.in instance of common.api.soap.Entity<br>Thrown-StackTrace:=20<br>at lib.gack.BaseGack.<init>(BaseGack.java:127)<br>at common.util.BaseSfdcGack.<init>(BaseSfdcGack.java:38)<br>at core.apexpages.exceptions.ApexPagesGack.<init>(ApexPagesGack.java:45)<br>at core.apexpages.exceptions.UnhandledApexPagesGack.<init>(UnhandledApexPagesGack.java:14)<br>at core.apexpages.exceptions.ApexpagesExceptionHandler.handledUnhandledException<br>(ApexPagesExceptionHandler.java:318)<br>at core.apexpages.exceptions.ApexpagesExceptionHandler.handledUnhandledException<br>(ApexPagesExceptionHandler.java:291)<br>at core.apexpages.exceptions.ApexpagesExceptionHandler.handlePagesException<br>(ApexPagesExceptionHandler.java:251)<br>at core.apexpages.exceptions.ApexpagesExceptionHandler.handleException(ApexPagesExceptionHandler.java:88)<br>at core.apexpages.framework.ApexViewServlet.handlePage(ApexViewServlet.java:277)<br>at common.request.servlet.BaseApplicationServlet.serviceinternal(BaseApplicationServlet.java:123)<br>at common.request.servlet.BaseApplicationServlet.doService(BaseApplicationServlet.Java:66)<br>at common.request.servlet.ProtectedHttpServlet.service(ProtectedHttpServlet.java:29)<br>at javax.servlet.http.HttpServlet.service(HttpServlet.java:91)<br>at com.caucho.server.dispatch.ServletFilterChain.doFilter(ServletFilterChain.java:103)<br>at org.ajax4jsf.webapp.BaseXMLFilter.doXmlFilter(BaseXMLFilter.java:206)<br>at core.apexpages.framework.ApexViewXMLFilter.doXMLFilter(ApexViewXMLFilter.java:25)<br>at org.ajax4jsf.webapp.BaseFilter.handleRequest(BaseFilter.java:290)<br>at org.ajax4jsf.webapp.BaseFilter.processUploadsAndHandleRequest(BaseFilter.java:388)<br>at org.ajax4jsf.webapp.BaseFilter.doFilter(BaseFilter.java:515)<br>at core.apexpages.framework.ApexViewFilter.doFilter(ApexViewFilter.java:26)<br>at com.caucho.server.dispatch.FilterFilterChain.doFilter(FilterFilterChain.java:87)<br>at com.caucho.filter.GzipFilter.doFilter(GzipFilter.java:151)<br>at system.filter.SfdcGzipFilter.doFilter(SfdcGzipFilter.java:28)<br>at com.caucho.server.dispatch.FilterFilterChain.doFilter(FilterFilterChain.java:87)<br>at system.filter.ChromeFrameFilter.doFilter(ChromeFrameFilter.java:69)<br>at com.caucho.server.dispatch.FilterFilterChain.doFilter(FilterFilterChain.java:87)<br>at core.dns.filter.CustomDomainMappingFilter.doFilter(CustomDomainMappingFilter.java:149)<br>at com.caucho.server.dispatch.FilterFilterChain.doFilter(FilterFilterChain.java:87)<br>at core.dns.filter.SiteRedirectMappingFilter.doFilter(SiteRedirectMappingFilter.java:214)<br>at com.caucho.server.dispatch.FilterFilterChain.doFilter(FilterFilterChain.java:87)<br>at core.dns.filter.BandwidthMeterFilter.doFilter(BandwidthMeterFilter.java:72)<br>at com.caucho.server.dispatch.FilterFilterChain.doFilter(FilterFilterChain.java:87)<br>at system.filter.RedirectFilter.doFilter(RedirectFilter.java:129)<br>at com.caucho.server.dispatch.FilterFilterChain.doFilter(FilterFilterChain.java:87)<br>at routing.filter.RemoteAddrFilterBase.doFilter(RemoteAddrFilterBase.java:70)<br>at com.caucho.server.dispatch.FilterFilterChain.doFilter(FilterFilterChain.java:87)<br>at com.caucho.server.dispatch.DispatchFilterChain.doFilter(DispatchFilterChain.java:93)<br>at com.caucho.server.dispatch.ServletInvocation.service(ServletInvocation.java:266)<br>at com.caucho.server.webapp.RequestDispatcherImpl.forward(RequestDispatcherImpl.java:283)<br>at com.caucho.server.webapp.RequestDispatcherImpl.forward(RequestDispatcherImpl.java:108)<br>at core.dns.filter.CustomDomainMappingFilter.doFilter(CustomDomainMappingFilter.java:337)<br>at com.caucho.server.dispatch.FilterFilterChain.doFilter(FilterFilterChain.java:87)<br>at core.dns.filter.SiteRedirectMappingFilter.doFilter(SiteRedirectMappingFilter.java:214)<br>at com.caucho.server.dispatch.FilterFilterChain.doFilter(FilterFilterChain.java:87)<br>at core.dns.filter.BandwidthMeterFilter.doFilter(BandwidthMeterFilter.java:91)<br>at com.caucho.server.dispatch.FilterFilterChain.doFilter(FilterFilterChain.java:87)<br>at system.filter.OrgDomainFilter.doFilter(OrgDomainFilter.java:56)<br>at com.caucho.server.dispatch.FilterFilterChain.doFilter(FilterFilterChain.java:87)<br>at system.filter.BasePreGzipFilter.doFilter(BasePreGzipFilter.java:122)<br>at com.caucho.server.dispatch.FilterFilterChain.doFilter(FilterFilterChain.java:87) | |

FIG. 8

CONTEXTUAL EXCEPTION MANAGEMENT IN MULTI-TENANT SYSTEMS

CROSS-REFERENCE TO RELATED APPLICATION(S)

This application claims the benefit of U.S. provisional patent application Ser. No. 61/513,764, filed Aug. 1, 2011, and U.S. provisional patent application Ser. No. 61/513,766, filed Aug. 1, 2011, the entire contents of which are incorporated by reference herein.

The subject matter described herein is related to the subject matter described in U.S. patent application Ser. No. 13/396,504, filed concurrently herewith.

TECHNICAL FIELD

Embodiments of the subject matter described herein relate generally to computer systems and networks configured to support applications executing on behalf of multiple tenants, and more particularly, embodiments of the subject matter relate to methods and systems for automatically generating and assigning exception records in a multi-tenant system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

During operation, an application provided to a tenant in a multi-tenant system may encounter an anomalous condition or otherwise generate an exception at run time. In relatively large-scale multi-tenant systems, pinpointing the root cause of the problem is often a cumbersome task due to the overall complexity of the software code being executed by the system and differences between the various tenants supported by the system. Thus, not only is identifying the cause of the problem difficult, but it is also difficult to identify which of the development teams, developers, or the like are responsible for the software module or portion of software code responsible for the anomalous condition.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 5-10 illustrate exemplary displays that may be presented on a client computing device in the software development system of FIG. 2 in connection with the exception management process of FIG. 3 and/or the exception assignment process of FIG. 4 in accordance with one or more exemplary embodiments.

DETAILED DESCRIPTION

Figure 1:
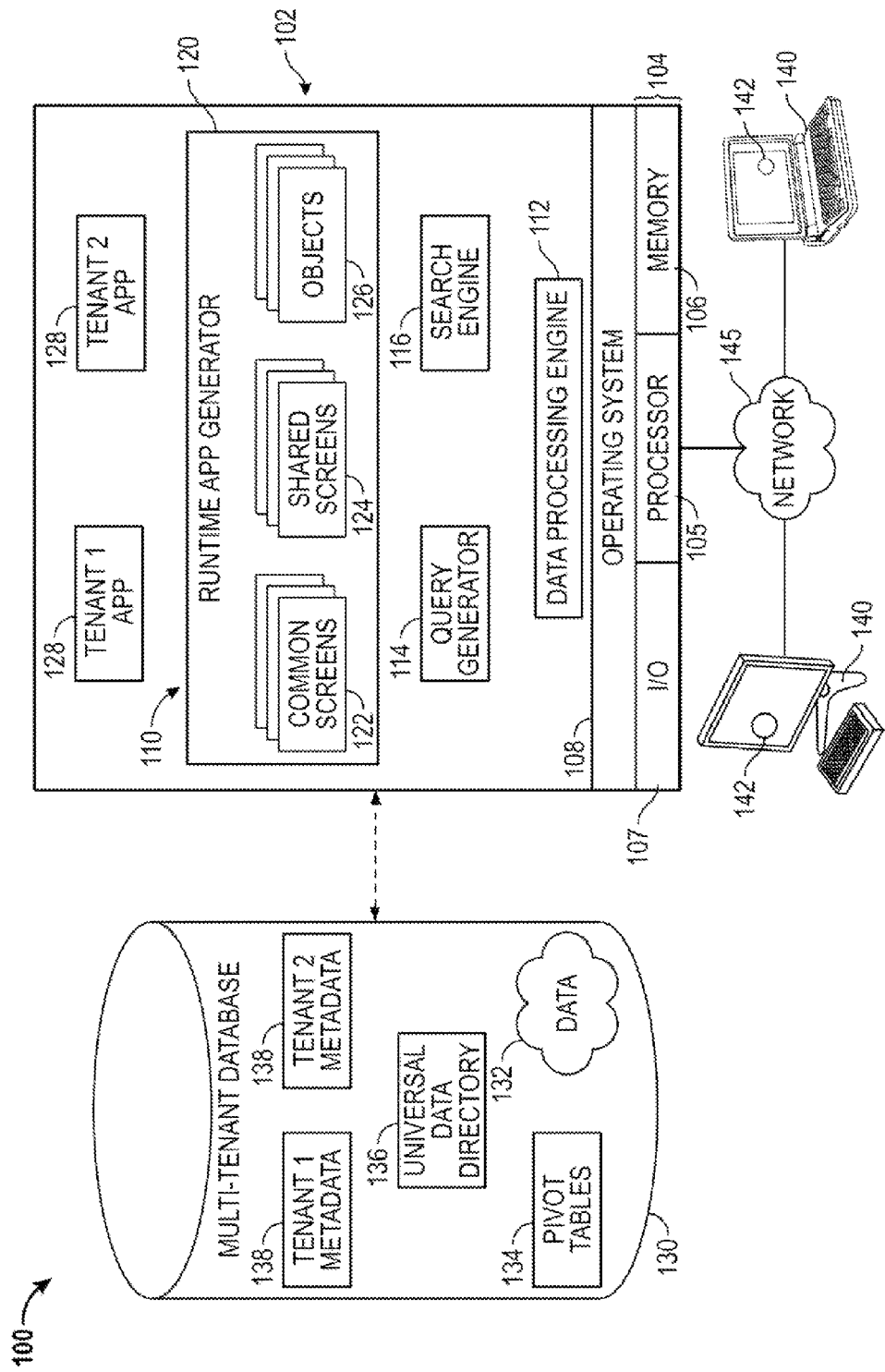
FIG. 1 is a block diagram of an exemplary multi-tenant system.

Embodiments of the subject matter described herein generally relate to automatically creating exception records for anomalous conditions identified by instances of a virtual application provided to users of various tenants in a multi-tenant system and automatically assigning the created exception records to a development entity, such as a developer, a development team, a project manager, or the like. As described in greater detail below, when an instance of a virtual application identifies an anomalous condition in a software module or code segment of the virtual application, the virtual application obtains or otherwise captures context information indicative of the state of the operating environment for that instance of the virtual application when the anomalous condition occurred. In an exemplary embodiment, the virtual application provides the code path or thread that resulted in the anomalous condition (e.g., the stack trace) along with the context information to an exception management system that automatically (e.g., without additional manual input or otherwise independent of any manual input or other manual intervention) creates an exception record for the anomalous condition that maintains the association between the context information and the code path that resulted in the anomalous condition.

In accordance with one or more embodiments, the exception management system automatically generates and assigns a unique numerical identifier to the exception record for distinguishing between different instances of anomalous conditions. In exemplary embodiments, the exception management system determines a numerical representation of the anomalous condition and assigns the numerical representation to the exception record, thereby allowing the exception management system to correlate or otherwise associate related instances of an anomalous condition.

After creating the exception record, in an exemplary embodiment, the exception management system automatically assigns the exception record to a development entity based on its associated context information. In accordance with one or more embodiments, the exception management system applies one or more pre-filters to assign exception records having a value for a field of context information selected by a user that satisfies a user-specified value for that field to a development entity identified by the user. If the pre-filters fail to assign an exception record to a development entity, the exception management system automatically assigns the exception record a development entity based on its context information, for example, by mapping the code path that resulted in the anomalous condition (or the numerical representation of the anomalous condition) to a particular development team. Additionally, in some embodiments, the exception management system applies one or more post-filters to augment, modify, and/or override the automatic assignment. After an exception record is automatically assigned to a development entity, the exception management system notifies the development entity, for example, by displaying a graphical representation of the assigned exception record to a developer when he or she accesses the exception management system, by emailing the developer the contents of the assigned exception record, by posting the assigned exception record to a web page associated with the developer, or the like.

Turning now to FIG. 1, an exemplary multi-tenant system 100 suitably includes a server 102 that dynamically creates and supports virtual applications 128 based upon data 132 from a common database 130 that is shared between multiple tenants, alternatively referred to herein as a multi-tenant database. Data and services generated by the virtual applications 128 are provided via a network 145 to any number of client devices 140, as desired. Each virtual application 128 is suitably generated at run-time using a common application platform 110 that securely provides access to the data 132 in the database 130 for each of the various tenants subscribing to the multi-tenant system 100. In accordance with one non-limiting example, the multi-tenant system 100 is implemented in the form of a multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. Tenants may represent customers, customer departments, business or legal organizations, and/or any other entities that maintain data for particular sets of users within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality without necessarily sharing any of the data 132 belonging to or otherwise associated with other tenants.

The multi-tenant database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by the virtual application 128 (e.g., via query generator 114).

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, and/or otherwise facilitate the application platform 110 and/or virtual applications 128 and perform additional tasks, operations, functions, and/or processes described herein. It should be noted that the memory 106 represents one suitable implementation of such computer-readable media, and alternatively or additionally, the server 102 could receive and cooperate with computer-readable media (not separately shown) that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

Still referring to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In operation, developers use the application platform 110 to create data-driven virtual applications 128 for the tenants that they support. Such virtual applications 128 may make use of interface features such as tenant-specific screens 124, universal screens 122 or the like. Any number of tenant-specific and/or universal objects 126 may also be available for integration into tenant-developed virtual applications 128. The data 132 associated with each virtual application 128 is provided to the database 130, as appropriate, and stored until it is requested or is otherwise needed, along with the metadata 138 that describes the particular features (e.g., reports, tables, functions, etc.) of that particular tenant-specific virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below. Typically, the user operates a conventional browser or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain JAVA®, ActiveX, or other content that can be presented using conventional client software running on the client device 140; other embodiments may simply provide dynamic web or other content that can be presented and viewed by the user, as desired. The query generator 114 suitably obtains requested subsets of data 132 from the database 130 as needed to populate the tables, reports or other features of the particular virtual application 128.

Figure 2:
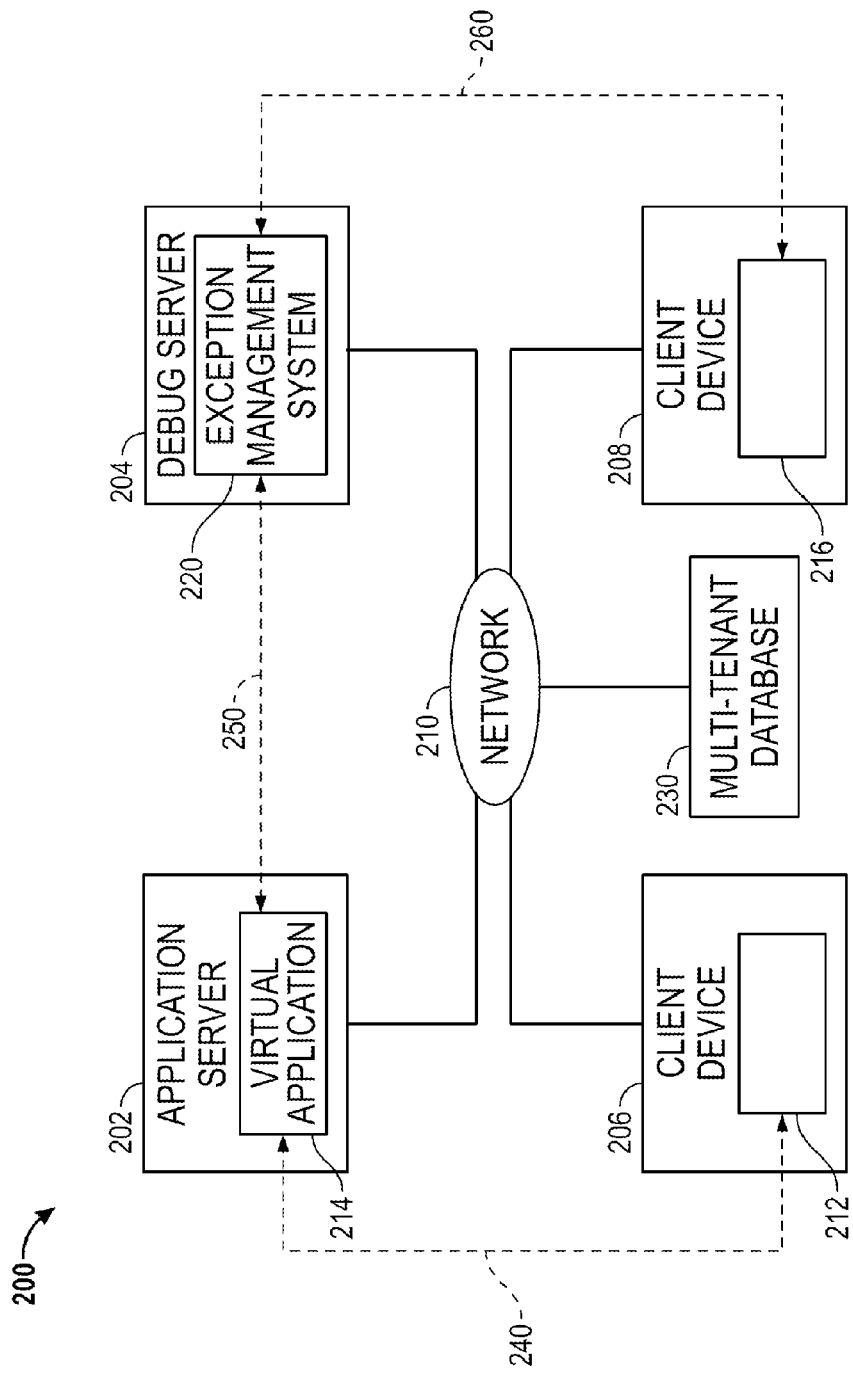
FIG. 2 is a block diagram of an exemplary software development system suitable for use with the multi-tenant system of FIG. 1 in accordance with one or more embodiments.

FIG. 2 illustrates an exemplary multi-tenant software development system 200 suitable for use with a multi-tenant computing system, such as the multi-tenant system 100. The illustrated software development system 200 includes an application server 202 (e.g., server 102), a development server 204, a multi-tenant database 230 (e.g., database 130), a first client computing device 206 (e.g., client device 140), a second client computing device 208, and a communications network 210 (e.g., network 145). The communications network 210 may be realized as any wired and/or wireless computer network that supports communications between the computing devices 206, 208, the servers 202, 204 and/or the multi-tenant database 230.

In exemplary embodiments, a user of the client computing device 206 operates or otherwise causes the client computing device 206 to execute an application 212 (e.g., a web browser or the like) to access the application server 202, wherein the application server 202 supports an instance of a virtual application 214 (e.g., virtual application 128) that is provided to the client device 206 via the network 210 (indicated by arrow 240) and presented or otherwise displayed within the application 212 executing on the client device 206. A user of the client device 206 may utilize the virtual application 214 to view, modify and/or otherwise utilize data maintained by the multi-tenant database 230 that is associated with the user's tenant and accessible to the user, as described above in the context of multi-tenant system 100 of FIG. 1. As described in greater detail below, when the virtual application 214 identifies an anomalous condition during execution, the virtual application 214 and provides information pertaining to the anomalous condition to an exception management system 220 on the development server 204 via the network 210 (indicated by arrow 250). In this regard, the exception management system 220 generally represents a software module executed by the development server 204 that is configured to automatically generate or otherwise create exception records based on the information received from the virtual application 214, maintain associations between related exception records, and automatically assign or otherwise classify the exception records to one or more development entities (e.g., one or more developers, development teams, project managers, or the like), as described in greater detail below in the context of FIGS. 3-4. In an exemplary embodiment, after creating and assigning an exception record to a developer, the exception management system 220 automatically provides notification of the exception record to the developer via the network 210 (indicated by arrow 260), for example, by displaying or otherwise providing a graphical indication of the exception record within an application 216 (e.g., a web browser) executing on a second client device 208 that is associated with that developer. The developer may utilize the application 216 to access the exception management system 220 to view the information pertaining to the anomalous condition that was provided by the virtual application 214 and/or view other exception records associated with that anomalous condition, as described in greater detail below in the context of FIGS. 6-9.

It will be appreciated that FIG. 2 is a simplified representation of the software development system 200 for purposes of explanation and is not intended to limit the subject matter in any way. In this regard, although FIG. 2 depicts the exception management system 220 as being implemented on a different server than the virtual application 214, in some embodiments, the exception management system 220 may be implemented by and/or execute on the application server 202 and/or some or all of the functionality described herein in the context of the exception management system 220 may be integrated with or otherwise implemented by the virtual application 214 and/or the application server 202.

Figure 3:
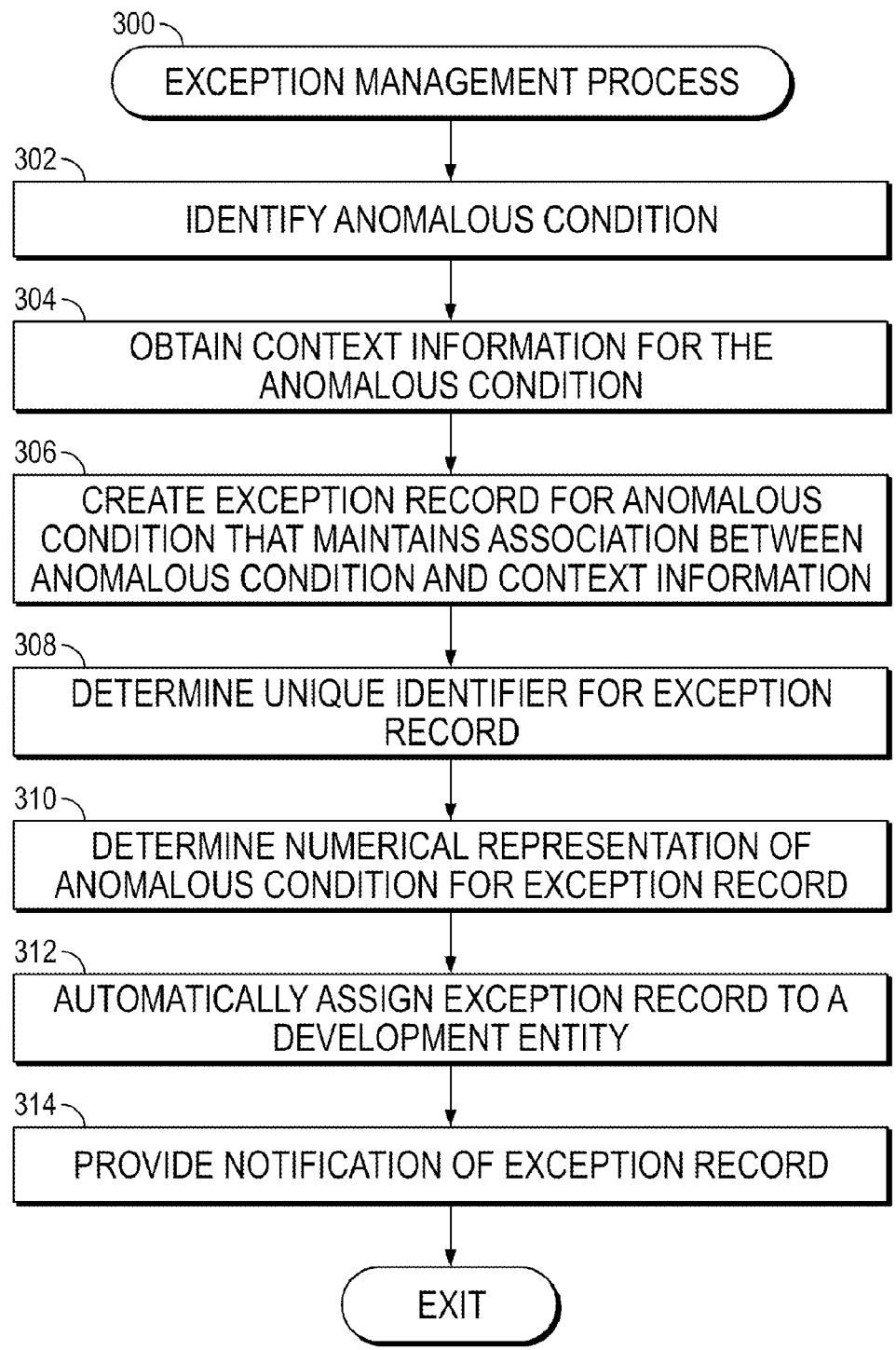
FIG. 3 is a flow diagram of an exemplary exception management process suitable for use with the multi-tenant system of FIG. 1 and/or the software development system of FIG. 2 in accordance with one or more exemplary embodiments.

FIG. 3 depicts an exemplary embodiment of an exception management process 300 suitable for implementation by a multi-tenant software development system to automatically generate exception records for anomalous conditions identified by various instances of a virtual application provided to multiple users and/or tenants. The various tasks performed in connection with the exception management process 300 may be performed by software, hardware, firmware, or any combination thereof. For illustrative purposes, the following description may refer to elements mentioned above in connection with FIGS. 1-2. In practice, portions of the exception management process 300 may be performed by different elements of the multi-tenant system 100 and/or the software development system 200, such as, for example, the application server 202, the development server 204, the virtual application 214, and/or the exception management system 220. It should be appreciated that the exception management process 300 may include any number of additional or alternative tasks, the tasks need not be performed in the illustrated order and/or the tasks may be performed concurrently, and/or the exception management process 300 may be incorporated into a more comprehensive procedure or process having additional functionality not described in detail herein. Moreover, one or more of the tasks shown and described in the context of FIG. 3 could be omitted from a practical embodiment of the exception management process 300 as long as the intended overall functionality remains intact.

Referring to FIG. 3, and with continued reference to FIGS. 1-2, in an exemplary embodiment, the exception management process 300 begins when a virtual application executing on an application server detects or otherwise identifies an anomalous condition (task 302). As used herein, an anomalous condition should be understood as referring to any fault, error, or other abnormality encountered during execution of a software module or other portion of code that makes up or otherwise supports the virtual application. In this regard, a virtual application may incorporate or otherwise include a number of different individual lower-level software modules that are integrated in a hierarchical manner to achieve the desired overall functionality to be provided by the virtual application. For convenience and ease of explanation, an anomalous condition may alternatively be referred to herein as an exception. In exemplary embodiments, during execution, when a code segment that is part of a software module of the virtual application 214 fails to execute properly, the software module generates (or throws) an exception that indicates, to the virtual application 214, the location or point in execution where the anomalous condition occurred. In this regard, the software module may provide a thread that indicates the place in the code path where the anomalous condition occurred, such as, for example, the call stack (or stack trace) at the time of the anomalous condition. Additionally, the software module may provide a message from a developer of the software module that expected cause of the anomalous condition identified by the developer during creation and/or development of the software module.

After identifying an anomalous condition, the exception management process 300 continues by identifying, capturing, or otherwise obtaining context information for the anomalous condition (task 304). In this regard, the context information identified by an instance of the virtual application 214 indicates the state of the operating environment that instance of the virtual application was executing in when the anomalous condition occurred. For example, in an exemplary embodiment, the virtual application 214 identifies or otherwise obtains the user associated with the client device 206 and/or application 212 accessing the virtual application 214, the tenant of the plurality of tenants supported by the multi-tenant software development system 200 that user is associated with, the permissions associated with the user of the client device 206, the software build of the instance of the virtual application 214 and/or other versioning information (e.g., the change list for the software module, the JAVA® release and/or JAVA® version supported by the application 212 executing on the client device 206, and the like), the type of data from the multi-tenant database 230 that was being presented and/or displayed by the virtual application 214 within application 212 when the anomalous condition occurred, and/or the location on the application server 202 being accessed by the application 212 (e.g., a uniform resource locator (URL), path, or other address). Additionally, when the virtual application 214 was attempting to access and/or retrieve data from the multi-tenant database 230 at the time of the anomalous condition, the virtual application 214 identifies or otherwise obtains the query provided to the multi-tenant database 230 (e.g., a structured query language (SQL) generated by the query generator 114) along with other information pertaining to the status of the multi-tenant database 230, including any error codes generated or otherwise provided by the multi-tenant database 230.

Still referring to FIG. 3, in an exemplary embodiment, the exception management process 300 continues by creating an exception record corresponding to the anomalous condition (task 306). In an exemplary embodiment, the instance of the virtual application 214 transmits or otherwise communicates, to the exception management system 220 via the network 210, the thread and/or code path resulting in the anomalous condition and any accompanying message generated and/or provided by the underlying software module along with the context information for the anomalous condition identified or otherwise obtained by the virtual application 214 (e.g., the user associated with the client device 206 and/or application 212, the tenant associated with the user, the versioning information, and the like). In response to receiving or otherwise obtaining the information pertaining to the anomalous condition, the exception management system 220 automatically creates an exception record that stores and/or maintains the association between the anomalous condition and its context information. In this regard, the exception record includes a data field corresponding to thread and/or code path resulting in the anomalous condition, wherein the exception management system 220 sets the value for that field equal to the thread and/or code path provided by the virtual application 214. For example, as described in greater detail below in the context of FIG. 8, in one embodiment, the exception record includes a "Thrown" field that is equal to the full stack trace provided by the virtual application 214. Additionally, the exception record includes a plurality of data fields corresponding to the different types of context information received from the virtual application 214, wherein the exception management system 220 sets the values for those fields to be equal to the context information provided by the virtual application 214. For example, as described in greater detail below in the context of FIGS. 7-8, in one embodiment, the exception record includes a "UserID" field that is equal to a numerical identifier associated with the user of the client device 206 and/or application 212 accessing the virtual application 214, an "OrganizationID" field that is equal to a numerical identifier associated with the user's tenant, a "Version" field that is equal to the current software build of the virtual application 214, and so on. In an exemplary embodiment, the exception record also includes one or more assignment fields for indicating one or more development entities assigned to the exception record, wherein the exception management system 220 initially assigns default (or null) values to the assignment fields. As described in greater detail below, in exemplary embodiments, the exception management system 220 automatically assigns values to one or more of the assignment fields based on one or more fields of the context information associated with the exception record.

After creating the exception record, the exception management process 300 continues by generating and assigning a unique identifier to the exception record (task 308). In this regard, each exception record created and maintained by the exception management system 220 has a unique numerical identifier for distinguishing between different instances of anomalous conditions, thereby allowing each exception record to be uniquely identified and/or indexed. For example, as described in greater detail below in the context of FIGS. 6-7 and 9, in one embodiment, the exception management system 220 generates a unique numerical identifier and assigns it to the exception record by setting a "UniqueID" field of the exception record to be equal to the unique numerical identifier.

After detecting an anomalous condition, the exception management process 300 continues by determining a numerical representation of the anomalous condition (task 310). In this regard, the numerical representation of the anomalous condition may be utilized to correlate exception records corresponding to instances of related anomalous conditions or to automatically assign the exception record to a particular development entity, as described in greater detail below. In an exemplary embodiment, the exception management system 220 determines the numerical representation of the anomalous condition in a deterministic manner based on the thread and/or code path that resulted in the anomalous condition and any accompanying message, such that exception records for instances of an anomalous condition that have substantially the same thread and/or code path and accompanying message will have the same numerical representation.

In accordance with one or more embodiments, the exception management system 220 filters the execution thread (i.e., the call stack at the time of the anomalous condition) provided by the virtual application 214 to remove portions of the code path that are not likely to be relevant to the problem and more closely identify the code segment responsible for the anomalous condition prior to determining the numerical representation of the anomalous condition. For example, in the multi-tenant software development system 200, the code path provided by the stack trace may include code segments that will vary depending on the particular user and/or tenant accessing the virtual application 214 that are not likely to be directly responsible for the anomalous condition and are only tangentially related to the anomalous condition. Additionally, the code path may include lower level method calls or routines (e.g., string to number conversion and the like) that are part of the standard features and/or functionality (e.g., part of a standard class library) of the particular programming language being utilized for the virtual application 214, which are unlikely to be the cause of the anomalous condition and are therefore removed prior to determining the numerical representation of the anomalous condition. In other embodiments, the code path provided by the stack trace may include code segments from various software modules and/or applications supported by the application platform along with code segments for accessing and/or retrieving data from the multi-tenant database 230, even though the code segment responsible for the anomalous condition may reside in a single software module and/or application. In this regard, the exception management system 220 filters the stack trace based on various filtering criteria to obtain a filtered code path, such that the filtered code path includes a reduced amount of code segments and/or other information. After obtaining the filtered code path, the exception management system 220 determines a numerical representation of the anomalous condition by performing a hash function on the filtered code path and the accompanying message to obtain a hash value. The exception management system 220 assigns the hash value to the exception record by setting the value of a field corresponding to the numerical representation of the anomalous condition to be equal to the hash value, thereby associating the hash value with the exception record. For example, as described in greater detail below in the context of FIGS. 7-8, in one embodiment, the exception management system 220 sets a "StackTraceID" field of the exception record to be equal to the hash value resulting from applying the hash function to the filtered "Thrown" field.

In an exemplary embodiment, the exception management process 300 continues by automatically assigning the anomalous condition to one or more development entities for subsequent debugging (task 312). As described in greater detail below in the context of the exception assignment process 400 of FIG. 4, in an exemplary embodiment, the exception management system 220 applies one or more filters to the exception record to identify a particular developer, development team, project manager, or the like that the exception record should be assigned to, or otherwise automatically assigns the exception record in accordance with a default assignment scheme. In this manner, the exception management system 220 determines what development entities the exception record should be assigned to and automatically assigns the exception record to those development entities based on the context information associated with that exception record.

Still referring to FIG. 3, in an exemplary embodiment, the exception management process 300 continues by providing notification of the newly created and assigned exception record (task 314). As described in greater detail below in the context of FIG. 10, in accordance with one embodiment, the exception management system 220 provides the unique identifier assigned to an exception record to the instance of the virtual application 214 that encountered the anomalous condition corresponding to the exception record and provided the context information associated with the anomalous condition, wherein when the anomalous condition disrupts operation of the virtual application 214, the virtual application 214 presents or otherwise displays the unique identifier to the user of the client device 206 within the application 212 to allow the user to follow up on the status of the anomalous condition. In an exemplary embodiment, after automatically assigning an exception record to a development entity, the exception management system 220 automatically provides notification of the assigned exception record to the development entity. For example, the exception management system 220 may email or otherwise message a developer via the application 216, or alternatively, the exception management system 220 may automatically present or otherwise display indication of the assigned exception record to the developer within the application 216 the next time the developer accesses the exception management system 220 via the application 216. As described in greater detail below in the context of FIGS. 6-9, the developer may then utilize the application 216 to view the assigned exception record maintained by the exception management system 220, including the various fields of context information associated with the exception record and/or other exception records correlated to the assigned exception record.

Figure 4:
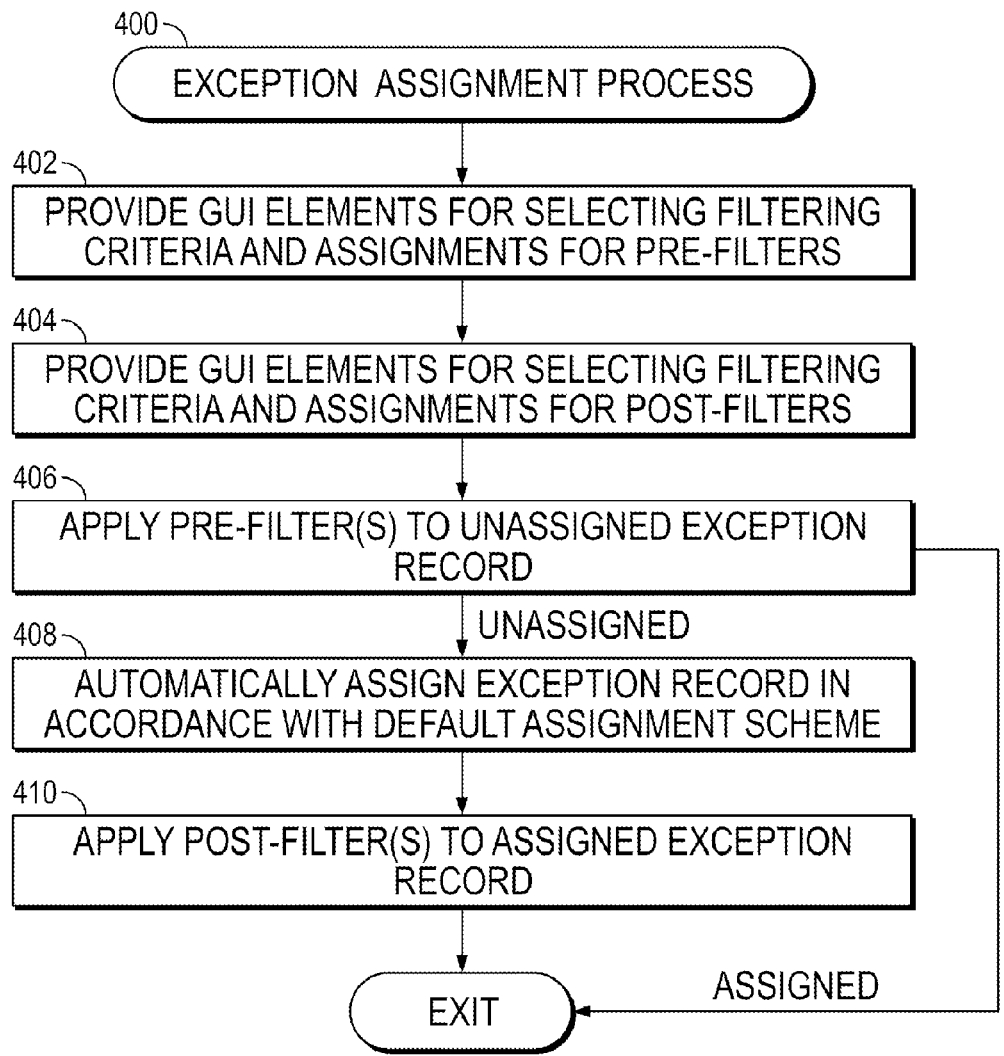
FIG. 4 is a flow diagram of an exemplary exception assignment process suitable for use with the multi-tenant system of FIG. 1 and/or the software development system of FIG. 2 in accordance with one or more exemplary embodiments.

FIG. 4 depicts an exemplary embodiment of an exception assignment process 400 suitable for implementation by a multi-tenant software development system to automatically assign exception records to development entities in connection with the exception management process 300 of FIG. 3. The various tasks performed in connection with the exception assignment process 400 may be performed by software, hardware, firmware, or any combination thereof. For illustrative purposes, the following description may refer to elements mentioned above in connection with FIGS. 1-2. In practice, portions of the exception assignment process 400 may be performed by different elements of the multi-tenant system 100 and/or the software development system 200, such as, for example, the application server 202, the development server 204, the virtual application 214, and/or the exception management system 220. It should be appreciated that the exception assignment process 400 may include any number of additional or alternative tasks, the tasks need not be performed in the illustrated order and/or the tasks may be performed concurrently, and/or the exception assignment process 400 may be incorporated into a more comprehensive procedure or process having additional functionality not described in detail herein. Moreover, one or more of the tasks shown and described in the context of FIG. 4 could be omitted from a practical embodiment of the exception assignment process 400 as long as the intended overall functionality remains intact.

Referring again to FIG. 4, and with continued reference to FIGS. 1-3, in an exemplary embodiment, the exception assignment process 400 provides, presents, or otherwise displays one or more GUI elements to enable a user to create and define one or more pre-filters for automatically assigning an exception record (task 402). In this regard, a pre-filter should be understood as referring a filtering operation that is applied to an unassigned exception record in an attempt to automatically assign the exception record to one or more development entities prior to attempting to assign the exception record using a default assignment scheme. The GUI elements allow a user to indicate or otherwise select filtering criteria along with assignment criteria for the pre-filter to be automatically applied to an unassigned exception record.

As described in greater detail below in the context of FIG. 5, in an exemplary embodiment, a user manipulates the application 216 to access and configure the exception management system 220, wherein the exception management system 220 presents or otherwise displays, within the application 216, a GUI element, such as a drop-down list or the like, adapted to allow a user to select a particular field from the possible fields of an exception record to be used for the filter. For convenience, a field selected to be used as a filtering criterion may alternatively be referred to herein as a filtering field. A user of the client device 208 may manipulate or otherwise interact with the GUI element to select or otherwise indicate the desired exception record field from a list of possible fields of information associated with the exception record to be used as the filtering field. Additionally, in an exemplary embodiment, the exception management system 220 presents or otherwise displays, within the application 216, a GUI element, such as a text box or the like, adapted to allow a user to indicate or otherwise provide a particular value for the filtering field, alternatively referred to herein as the filtering criterion for the filtering field. The exception management system 220 also presents or otherwise displays a GUI element, such as a drop-down list, adapted to allow a user to indicate or otherwise select a particular assignment field from the possible assignment fields of an exception record to be automatically assigned by the filter along with another GUI element, such as a text box, adapted to allow a user to indicate or otherwise provide a particular value to be automatically assigned to that selected assignment field, alternatively referred to herein as the assignment value. As described in greater detail below in the context of FIG. 5, a plurality of pre-filters may be created by a user, and the user may order the pre-filters in a desired sequence to achieve a desired assignment scheme when the pre-filters are sequentially applied to an unassigned exception record.

Still referring to FIG. 4, in an exemplary embodiment, the exception assignment process 400 also provides, presents, or otherwise displays one or more GUI elements to enable a user to create one or more post-filters for automatically assigning an exception record (task 404). In this regard, a post-filter should be understood as referring a filtering operation that is applied to an exception record after the pre-filters have been applied to the exception record and the exception record has been automatically assigned in accordance with a default assignment scheme. Thus, a post-filter may augment, modify, and/or override assignments made by the default assignment scheme when the pre-filters fail to assign the exception record. In a similar manner as described above, the exception management system 220 presents or otherwise displays a GUI element adapted to allow a user to select a particular field to be used for the post-filter along with a GUI element adapted to allow a user to provide a particular value for the selected field to be used as the filtering criterion for the post-filter. The exception management system 220 also presents or otherwise displays a GUI element adapted to allow a user to select a particular field to be automatically assigned by the post-filter along with a GUI element adapted to allow a user to provide a particular value to be automatically assigned to that field. As described in greater detail below, any number of post-filters may be created by a user, and the user may order the post-filters in a desired manner to achieve a desired assignment scheme.

In an exemplary embodiment, the exception assignment process 400 continues by obtaining or otherwise identifying an unassigned exception record and applying any pre-filters to the unassigned exception record (task 406). In this regard, after the exception management system 220 automatically creates an exception record for an anomalous condition identified by the virtual application 214 (e.g., tasks 306, 308 and 310) with default (or null) values for the assignment fields, the exception management system 220 identifies any pre-filters that have been previously defined and applies the identified pre-filters to the exception record in the order specified by a user to automatically assign values to one or more assignment fields of the exception record. For example, when the value of the filtering field of the unassigned exception record satisfies the filtering criterion provided by a pre-filter, the exception management system 220 automatically sets one or more assignment fields of the unassigned exception record to values specified by that pre-filter. When a pre-filter fails to assign any assignment fields of the exception record, the exception management system 220 applies the next pre-filter in the order specified by the user to the unassigned exception record until all of the pre-filters have been applied. In an exemplary embodiment, once an exception record is assigned by one of the pre-filters, the exception assignment process 400 terminates or otherwise exits.

In an exemplary embodiment, when the pre-filters fail to assign the exception record, the exception assignment process 400 continues by automatically assigning an unassigned exception record in accordance with a default assignment scheme (task 408). In accordance with one or more embodiments, the exception management system 220 maps one or more fields of the context information of the unassigned exception record to one or more development entities. For example, the exception management system 220 may perform one or more algorithms to map different exception records to different development teams based on the values of one or more fields of the exception records, such that the exception records are distributed substantially equally across the different development teams while ensuring that exception records having the same values for the those fields are assigned to the same development team. In this regard, the default assignment scheme implemented by the exception management system 220 may ensure that correlated exception records having the same numerical representation of their anomalous condition (e.g., the same "StackTraceID" value) are assigned to the same development team. In other embodiments, the exception management system 220 may maintain a mapping of the various software modules of the virtual application 214 to the different numerical representations of anomalous condition, wherein based on the numerical representation of the anomalous condition of an unassigned exception record, the exception management system 220 identifies the corresponding software module and assigns the exception record to the development entity associated with that software module. It will be appreciated that there are numerous manners in which the exception records may be assigned, and the subject matter described herein is not intended to be limited to any particular default scheme for assigning exception records.

Still referring to FIG. 4, in an exemplary embodiment, the exception assignment process 400 continues by applying any post-filters to the exception record (task 410). In a similar manner as described above for the pre-filters, the exception management system 220 identifies any post-filters that have been defined and applies the post-filters in the specified order to automatically assign values to one or more assignment fields of the exception record. When the value of the filtering field of an exception record satisfies the filtering criterion provided by a post-filter, the exception management system 220 automatically sets the selected assignment field(s) of the exception record to the value(s) specified by that post-filter. In this manner, the post-filters may augment, modify, and/or override any assignments that were previously made by the exception management system 220 in accordance with the default assignment scheme. For example, if a selected assignment field specified by a post-filter is the same as one previously assigned by the exception management system 220, the post-filter overwrites the assignment previously made using the default assignment scheme, whereas if the selected assignment field specified by the post-filter is different from one previously assigned by the exception management system 220, the post-filter merely augments the assignment made by the default assignment scheme. Once the exception record has been assigned by a post-filter or all of the post-filters have been applied, the automatic assignment of the exception record is complete and the exception assignment process 400 exits or repeats for any additional unassigned exception records that are generated by the exception management system 220 in response to obtaining information pertaining to an anomalous condition from a virtual application 214.

Figure 5:
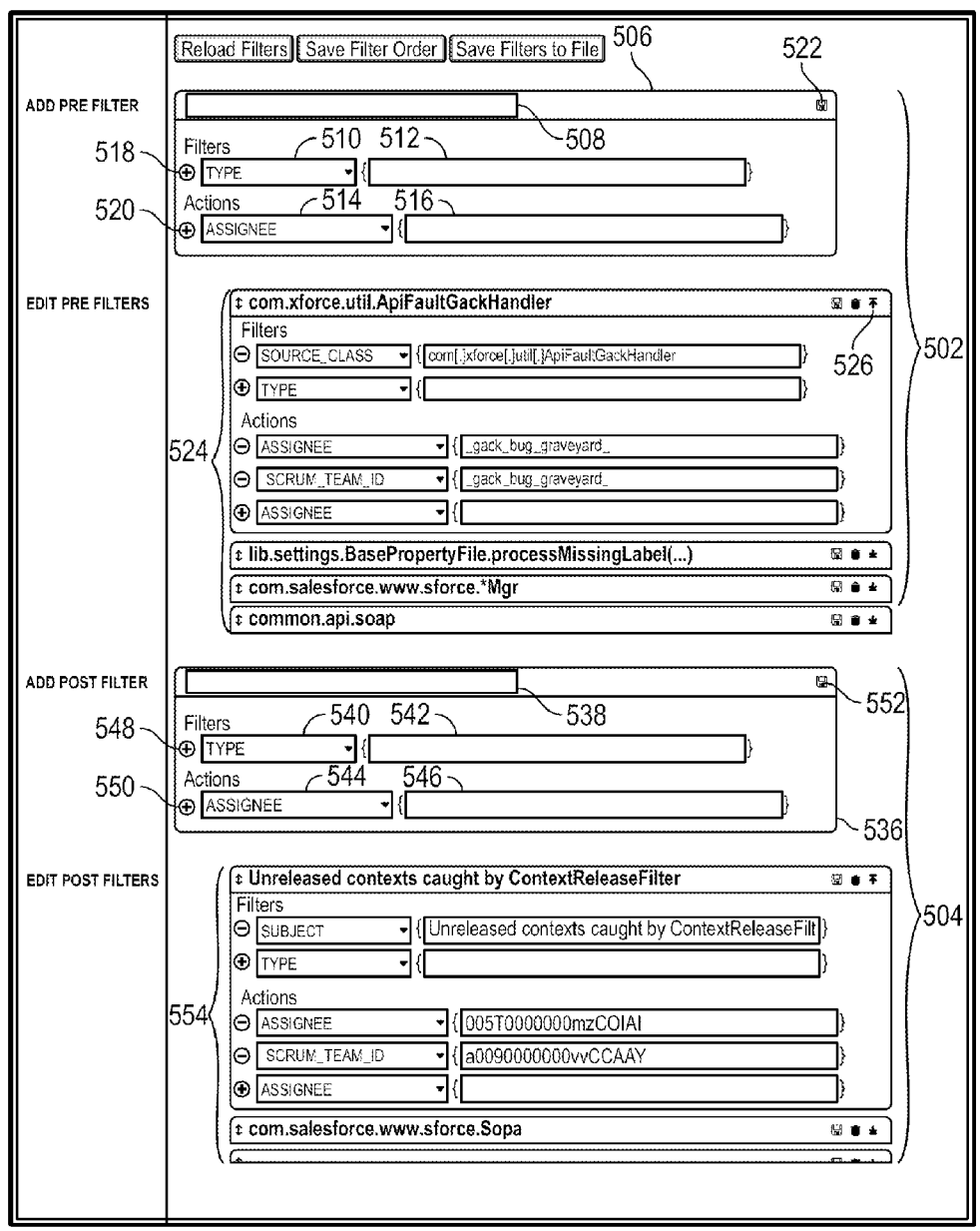

FIGS. 5-9 illustrate exemplary displays that may be graphically presented by the exception management system 220 within an application 216 (e.g., a web browser or the like) executing on a client device 208 in connection with an exemplary embodiment of the exception management process 300 of FIG. 3 and/or the exception assignment process 400 of FIG. 4. Referring to FIG. 5, in an exemplary embodiment, when a user of the client device 208 manipulates the application 216 to access and configure the exception management system 220, the exception management system 220 presents an assignment filter configuration display 500 that is divided or otherwise partitioned into an upper portion 502 corresponding to the pre-filters to be implemented by the exception management system 220 and a lower portion 504 corresponding to the post-filters to be implemented by the exception management system 220. As illustrated, an upper region 506 of the upper portion 502 includes a first GUI element 508, such as a text box, for providing a name for the pre-filter being created, a second GUI element 510, such as a drop-down list, for selecting a particular field of the exception records to be used as a filtering field, a third GUI element 512, such as a text box, for providing a particular value for the filtering field to be used as a filtering criterion, a fourth GUI element 514, such as a drop-down list, for selecting a particular assignment field of the exception records to be automatically assigned by the pre-filter, and a fifth GUI element 516, such as a text box, for providing a particular value to be assigned to the assignment field selected or otherwise indicated by the fourth GUI element 514. The user manipulates the GUI elements 508, 510, 512, 514, 516 to define the filtering field, the filtering criterion, the assignment field, and assignment value for pre-filter. In the illustrated embodiment, the exception management system 220 also displays additional GUI elements 518, 520, such as buttons, that allow the user to add additional filtering fields and/or assignment fields to the pre-filter. For example, the user may select button 518 to add a second filtering field and filtering criterion, wherein an unassigned exception record will be automatically assigned by the pre-filter when the first filtering field of the unassigned exception record matches the first filtering criterion and the second filtering field of the unassigned exception record matches the second filtering criterion. Similarly, the user may select button 520 to add a second assignment field and a second assignment value, wherein the filtering fields of an unassigned exception record match the filtering criteria of the pre-filter, the first assignment field of the unassigned exception record will be assigned the first assignment value and the second assignment field of the unassigned exception record will be assigned the second assignment value.

After manipulating the GUI elements to define the pre-filter, the user selects another GUI element 522, such as a button, to save the pre-filter, wherein the exception management system 220 updates an ordered list of existing pre-filters presented in a second region 524 of the portion 502 to include the newly created pre-filter. In this regard, the pre-filters are listed in the second region 524 in the order in which they will be sequentially applied during execution of the exception assignment process 400. In an exemplary embodiment, the second region 524 provides a drag-and-drop interface that allows the user to order the pre-filters by selecting and dragging them up or down within the list of pre-filters. As illustrated, the filter configuration display 500 also includes a GUI element 526, such as a button, that allows a user to expand a previously created pre-filter in the second region 524 to view and/or modify the filtering field, the filtering criterion, the assignment field, and/or the assignment value for the selected pre-filter.

Similarly, for the post-filters, an upper region 536 of the lower portion 504 of the filter configuration display 500 includes a text box 538 for providing a name for a new post-filter, a drop-down list 540 for selecting a particular field to be used as a filtering field, a text box 542 for providing a filtering criterion for the filtering field, a drop-down list 544 for selecting an assignment field to be automatically assigned by the post-filter, and a text box 546 for providing an assignment value for the selected assignment field. The upper region 536 also includes buttons 548, 550 for adding additional filtering fields and/or assignment fields to the pre-filter. After manipulating the GUI elements to define the post-filter, the user selects button 552 to save the post-filter, wherein the exception management system 220 updates an ordered list of existing post-filters presented in a second region 554 of the portion 504 to include the newly created post-filter. The user may then view and/or modify existing post-filters and rearrange the ordering of the post-filters in the second region 554 to define the order in which they will be applied during execution of the exception assignment process 400, as described above.

Figure 6:

Referring now to FIG. 6, after performing the exception management process 300 and/or exception assignment process 400 to automatically create and assign an exception record for an anomalous condition identified by the virtual application 214, the exception management system 220 may present an exception record display 600 for an assigned exception record within the application 216 on the client device 208. For example, a user of the client device 208 may utilize the application 216 to select a particular exception record for viewing from a list of exception records created and/or maintained by the exception management system 220. In other embodiments, the exception management system 220 may automatically present the exception record display 600 within the application 216 in response to assigning an exception record to the user of the application 216. For example, the exception management system 220 may automatically present the exception record display 600 within the application 216 when a developer assigned to the displayed exception record accesses the exception management system 220 via the application 216.

In the illustrated embodiment, the exception record display 600 includes a graphical representation 601 of the unique numerical identifier assigned to the displayed exception record and an identification region 602 that includes identifying information for the displayed exception record. The identification region 602 includes context information for the anomalous condition identified and/or provided by the virtual application 214, such as, for example, with the versioning and/or build information (e.g., "Found in Build", "Scheduled Build") for the instance of the virtual application 214 along with the message associated with the anomalous condition provided by the virtual application 214 (e.g., the "Subject"). Additionally, the identification region 602 includes additional information pertaining to the displayed exception record, such as for example, the frequency, priority, and the like, which may be automatically determined by the exception management system 220 and/or provided to the exception management system 220 by a user of the application 216. As illustrated, the exception record display 600 also includes an assignment region 604 that includes the various assignment fields of the displayed exception record and the development entities that were automatically assigned to the displayed exception record by the exception assignment process 400, such as, for example, the developer that the exception record was assigned to (e.g., 'Developer 1'), a development team the exception record was assigned to (e.g., 'Development Team 1'), a project manager the exception record was assigned to (e.g., 'Project Manager 1'), and the like. In the illustrated embodiment, the exception record display 600 also includes a third region 606 that includes additional information for the displayed exception record identified and/or determined by the exception management system 220, along with a notification region 608 that identifies the various users that the exception management system 220 automatically notified of the exception record upon creation and assignment of the exception record, including the individual developers, development team members, project managers, and the like that the exception record was assigned to.

Referring now to FIGS. 7-8 and with continued reference to FIG. 6, in the illustrated embodiment, the third region 606 of the exception record display 600 includes a hyperlink 610 or another equivalent GUI element (e.g., a button or the like) for viewing additional information associated with the displayed exception record within the application 216. FIG. 7 depicts an exemplary context information display 700 that may be presented within the application 216 when the user selects the hyperlink 610. The illustrated context information display 700 graphically presents the various fields of the exception record along with their associated value. For example, as illustrated, the context information display 700 includes the unique numerical identifier 702 assigned to the exception record (e.g., the "UniqueId" field) and the numerical representation of the anomalous condition 704 (e.g., the "StackTraceID" field) along with other context information identified and/or provided by the virtual application 214, such as, for example, the user 706 accessing the virtual application 214 when the anomalous condition occurred (e.g., the "UserId" field), the tenant 708 associated with that user (e.g., the "OrganizationId" field). The context information display 700 of FIG. 7 also includes information pertaining to the source class associated with the anomalous condition (e.g., the "SourceClassName", the "SourceClassMethod", and the like) determined by the exception management system 220 based on the thread and/or code path for the anomalous condition along with the JAVA® version 710 supported by the application 212 on the client device 206. FIG. 8 depicts another exemplary context information display 800 that includes additional context information, such as the full stack trace (or code path) for the anomalous condition 802 that was provided by the virtual application 214 (e.g., the "Thrown" field) and hashed by the exception management system 220 to determine the numerical representation 704 and filtered by the exception management system 220 to determine the source class information shown on the context information display 700 of FIG. 7. As illustrated, the context information display 800 also includes additional versioning information, such as the build and/or version information 806 for the virtual application 214, the JAVA® version 808 supported by the application 212, the change list 810 for the virtual application 214, and the like, along with the location 804 on the application server 202 that was being accessed by the application 212 when the anomalous condition occurred.

Figure 9:
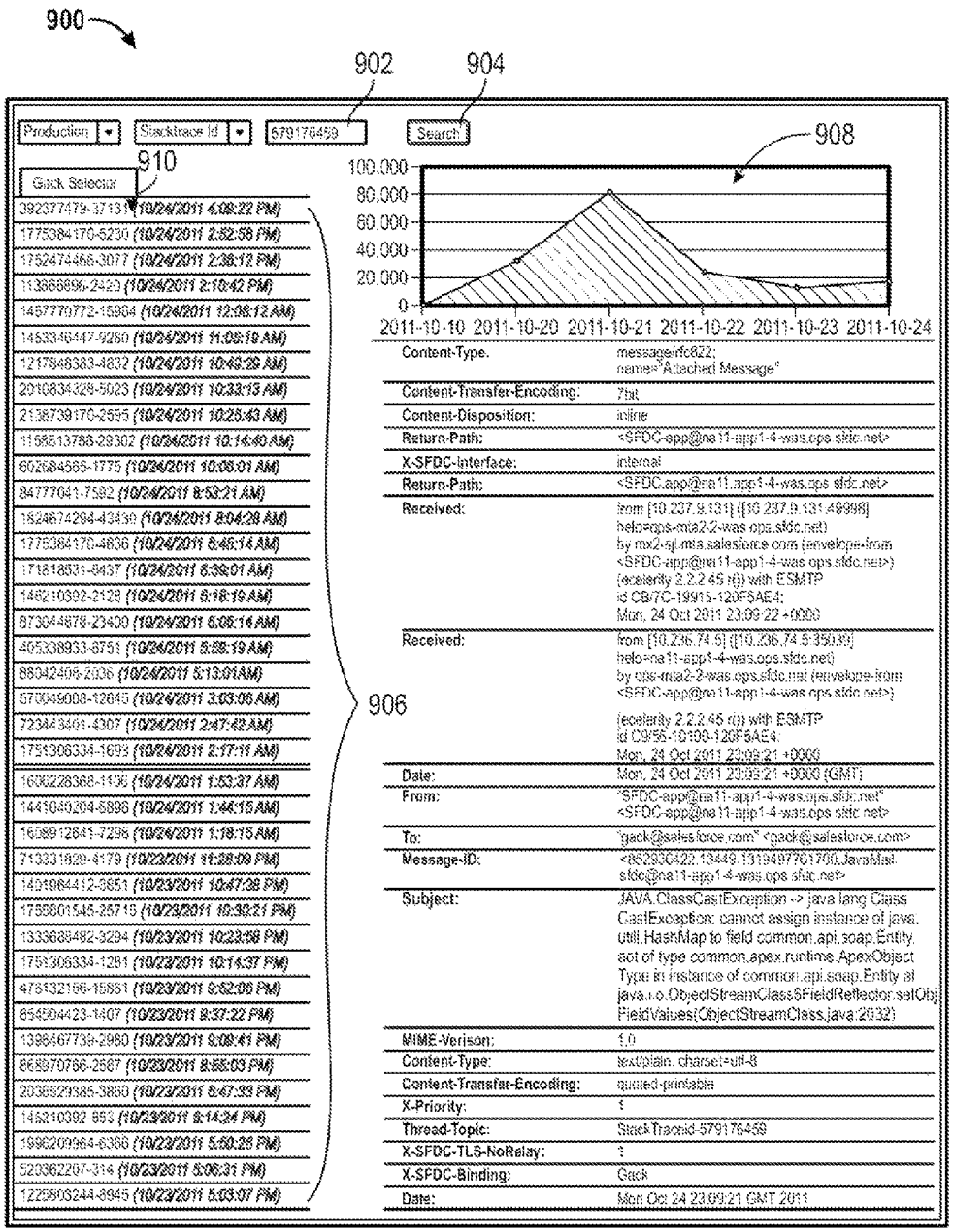

Referring now to FIG. 9, in accordance with one or more embodiments, the exception management system 220 is capable of displaying or otherwise presenting a correlated exception record display 900 within an application 216 on a client computing device 208. As illustrated, the exception management system 220 may present, within the application 216, a GUI element 902, such as a text box, adapted to allow a user to provide a numerical representation of an anomalous condition for which the user would like to view information for (e.g., a particular "StackTraceID" value). After providing the desired numerical representation in the text box 902, the user of the client device 208 may select another GUI element 904 presented within the application 216, such as a button, to search for any exception records having a numerical representation that matches the value provided in the text box 902. In response, the exception management system 220 identifies the exception records having a "StackTraceID" field value matching the value provided in the text box 902 and displays, within a region 906 of the exception record display 600, a list of the unique numerical identifiers corresponding to the identified exception records. In the illustrated embodiment, based on the identified exception records matching the query value in the text box 902, the exception management system 220 displays a graphical representation (e.g., a plot, graph, chart, or the like) of the number of occurrences of the anomalous condition versus time in another region 908 of the display to visually illustrate the relative frequency at which the instances of the anomalous condition are occurring across the various users and/or tenants supported by the multi-tenant software development system 200. A developer may select a particular exception record from the list to present an exception record display, such as exception record 910 to present exception record display 600. By correlating the anomalous conditions and capturing the context information for each of the correlated anomalous conditions, a developer may more readily identify commonalities between the various instances of the anomalous condition and resolve the problem. For example, if each of the correlated anomalous conditions have the same value for a particular field of context information (e.g., the software version and/or build, the same communication protocol, or the like), the developer may focus on that piece of contextual information when trying to resolve the anomalous condition.

Figure 10:
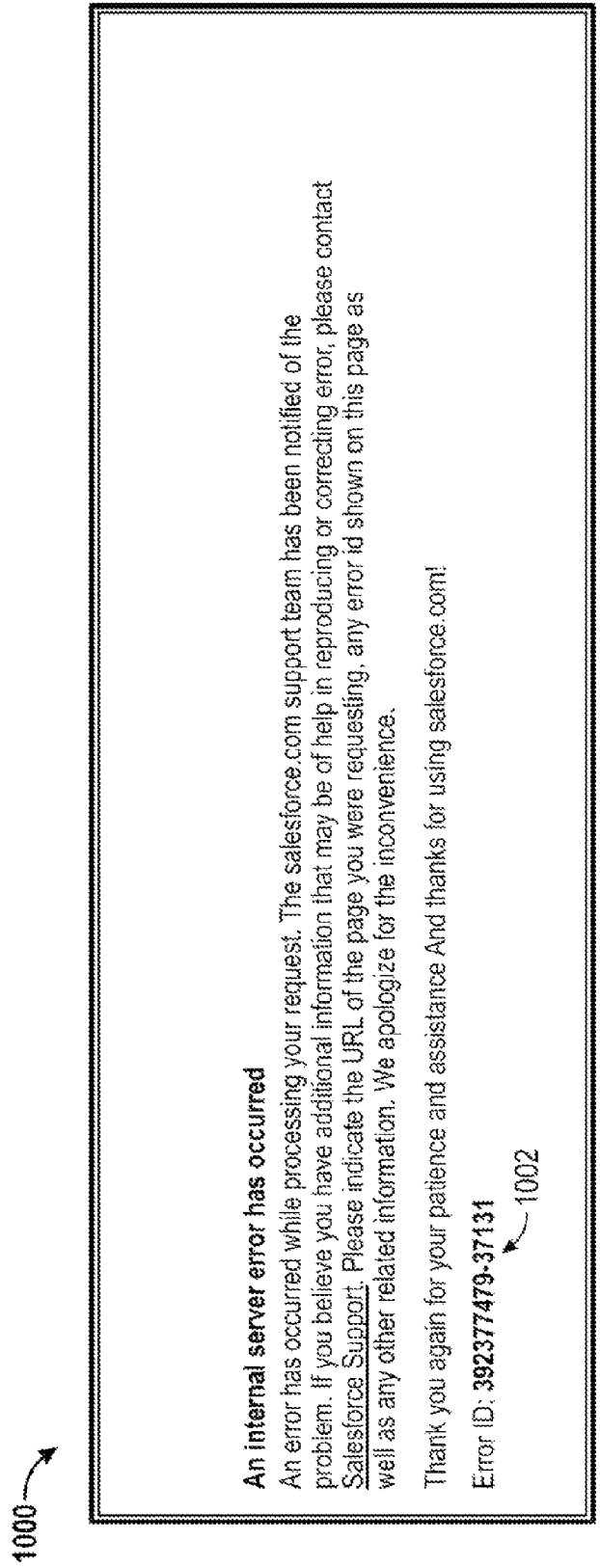

FIG. 10 illustrates an exemplary exception display 1000 that may be presented by a virtual application on a client computing device. Referring to FIG. 10, and with continued reference to FIGS. 1-3, in accordance with one or more embodiments, in response to receiving information pertaining to an anomalous condition from the virtual application 214, the exception management system 220 provides the virtual application 214 with the unique numerical identifier assigned to the exception record for that anomalous condition. In this regard, when the anomalous condition disrupts the execution of the software module of the virtual application 214, the virtual application 214 and/or the application server 202 may display, within the application 212 on the client device 206, the unique numerical identifier 1002 assigned to the exception record for the anomalous condition to the user of the client device 206. The unique numerical identifier may be utilized as a reference to allow the user to follow up on the status of the anomalous condition with the operator of the software development system 200 or other technical support personnel.

It will be appreciated that the foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, exception handling, multi-tenancy, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of assigning an exception record in a multi-tenant system providing instances of a virtual application over a network to a plurality of tenants, the exception record corresponding to an anomalous condition identified by an instance of the virtual application, the method comprising:
    obtaining context information associated with the anomalous condition from the instance of the virtual application, the anomalous condition comprising an exception generated by a code segment of the virtual application during execution, wherein the context information is indicative of a state of an operating environment for the instance of the virtual application when the anomalous condition occurred and includes a code path that resulted in the anomalous condition; and
    assigning the exception record to a development entity based at least in part on the context information, wherein assigning the exception record comprises:
        assigning the exception record to a first development entity when the context information satisfies a first filter; and
        when the context information does not satisfy the first filter:
            automatically assigning the exception record to a second development entity by mapping the exception record to the second development entity based on a numerical representation of the anomalous condition, the numerical representation being based at least in part on the code path; and
            after assigning the exception record to the second development entity, assigning the exception record to a third development entity when the context information satisfies a second filter.

2. The method of claim 1, further comprising displaying a graphical representation of the exception record on a display device, wherein the graphical representation indicates the development entity assigned to the exception record.

3. The method of claim 1, wherein assigning the exception record comprises setting a value of an assignment field of the exception record to a value corresponding to the development entity based on the context information.

4. The method of claim 3, wherein setting the assignment field to the value comprises automatically setting the value of the assignment field to the value corresponding to the development entity when the context information satisfies a filter criterion.

5. The method of claim 1, wherein:
    assigning the exception record to the first development entity comprises automatically setting an assignment field of the exception record to a first value corresponding to the first development entity when the context information satisfies a first filter criterion provided by the first filter; and
    assigning the exception record to the second development entity comprises automatically setting the assignment field to a second value corresponding to the second development entity.

6. The method of claim 5, further comprising:
    providing a first graphical user interface element enabling indication of a first field of the context information from a plurality of possible fields of the context information; and
    providing a second graphical user interface element enabling indication of the first filter criterion for the first field, wherein assigning the exception record to the first development entity comprises automatically setting the assignment field to the first value when the first field of the exception record matches the first filter criterion.

7. The method of claim 1, wherein assigning the exception record to the second development entity based at least in part on the context information comprises mapping the exception record to the second development entity based on a software module associated with the anomalous condition.

8. The method of claim 1, wherein assigning the exception record to the first development entity comprises applying a pre-filter to automatically assign the exception record to the first development entity when a first field of the context information of the exception record satisfies a filtering criterion provided by the pre-filter.

9. The method of claim 1, further comprising:
    providing a first graphical user interface element enabling indication of a first field of the context information from a plurality of possible fields of the context information;
    providing a second graphical user interface element enabling indication of a first filter criterion for the first field;
    providing a third graphical user interface element enabling indication of a first assignment field from a plurality of possible assignment fields; and
    providing a fourth graphical user interface element enabling indication of an assignment value for the first assignment field, the assignment value corresponding to the first development entity, wherein assigning the exception record to the first development entity comprises automatically setting the first assignment field of the exception record to the assignment value when the first field of the exception record satisfies the first filter criterion.

10. The method of claim 1, further comprising notifying the development entity of the exception record after automatically assigning the exception record.

11. A method of assigning an exception record in a multi-tenant system including an application server providing instances of a virtual application over a network to a plurality of tenants, the method comprising:
    obtaining, by an exception management system from an instance of the virtual application executing on the application server, context information associated with an anomalous condition identified by the virtual application corresponding to the exception record, the anomalous condition comprising an exception generated by a code segment of the virtual application during execution, wherein the context information is indicative of a state of an operating environment for the instance of the virtual application when the anomalous condition occurred and includes a code path that resulted in the anomalous condition;

automatically assigning, by the exception management system, the exception record to a development entity based at least in part on the context information, wherein automatically assigning the exception record comprises:

applying one or more pre-filters to the exception record; and when the one or more pre-filters fail to assign the exception record:

assigning the exception record to a first development entity in accordance with a default assignment scheme by mapping the exception record to the first development entity based on a numerical representation of the anomalous condition, the numerical representation being based at least in part on the code path; and after assigning the exception record to the first development entity, applying a post-filter to assign the exception record to a second development entity; and graphically indicating, by the exception management system, the exception record is assigned to the development entity within an application on a client device coupled to the network.

12. The method of claim 11, further comprising displaying, within the application, a first graphical user interface element enabling indication of a first field of the context information from a plurality of possible fields of the context information;

displaying, within the application, a second graphical user interface element enabling indication of a first filter criterion for the first field;

displaying, within the application, a third graphical user interface element enabling indication of a first assignment field from a plurality of possible assignment fields; and displaying, within the application, a fourth graphical user interface element enabling indication of an assignment value for the first assignment field, the assignment value corresponding to the development entity, wherein assigning the exception record to the development entity comprises automatically setting the first assignment field of the exception record to the assignment value when the first field of the exception record matches the first filter criterion.

13. A multi-tenant system comprising:

an application server configured to provide an instance of a virtual application to a first tenant of a plurality of tenants over a network, the virtual application being configured to identify an anomalous condition and obtain context information associated with the anomalous condition, the anomalous condition comprising an exception generated by a code segment of the virtual application during execution, the context information being indicative of a state of an operating environment for the instance of the virtual application when the anomalous condition occurred and including a code path that resulted in the anomalous condition, wherein the application server comprises processing hardware; and an exception management system coupled to the application server, wherein the exception management system is configured to create a record maintaining an association between the anomalous condition and the context information and automatically assign the record to a development entity based at least in part on the context information by:

automatically assigning the exception record to a first development entity when the context information satisfies a pre-filter; and when the context information does not satisfy the pre-filter:

automatically assigning the exception record to a second development entity in accordance with a default assignment scheme by mapping the exception record to the second development entity based on a numerical representation of the anomalous condition, the numerical representation being based at least in part on the code path; and after assigning the exception record to the second development entity, automatically assigning the exception record to a third development entity when the context information satisfies a post-filter.

14. The multi-tenant system of claim 13, wherein the exception management system is configured to display a graphical representation of the record within an application on a client device coupled to the exception management system over the network, the graphical representation indicating the development entity assigned to the record.

15. The method of claim 1, wherein the code segment is part of a software module of the virtual application, the software module generates the exception, and the exception indicates a point in the execution where the anomalous condition occurred.

* * * * *